United States Patent
Dommnik et al.

(10) Patent No.: US 12,230,945 B2
(45) Date of Patent: Feb. 18, 2025

(54) ENERGY CHAIN AND STORAGE UNIT FOR AN ENERGY CHAIN

(71) Applicant: igus GmbH, Cologne (DE)

(72) Inventors: Jörg Dommnik, Neunkirchen-Seelscheid (DE); Simon Moritz, Cologne (DE)

(73) Assignee: igus GmbH, Cologne (DE)

( * ) Notice: Subject to any disclaimer, the term of this patent is extended or adjusted under 35 U.S.C. 154(b) by 296 days.

(21) Appl. No.: 17/786,962

(22) PCT Filed: Dec. 18, 2020

(86) PCT No.: PCT/EP2020/087110
§ 371 (c)(1),
(2) Date: Jun. 17, 2022

(87) PCT Pub. No.: WO2021/123231
PCT Pub. Date: Jun. 24, 2021

(65) Prior Publication Data
US 2023/0054614 A1 Feb. 23, 2023

(30) Foreign Application Priority Data
Dec. 19, 2019 (DE) .................. 20 2019 107 116.8

(51) Int. Cl.
*H02G 11/00* (2006.01)
*B65H 75/36* (2006.01)
*F16G 13/16* (2006.01)

(52) U.S. Cl.
CPC ......... *H02G 11/006* (2013.01); *B65H 75/364* (2013.01); *F16G 13/16* (2013.01)

(58) Field of Classification Search
CPC .............................. F16G 13/16; H02G 11/006
See application file for complete search history.

(56) References Cited

U.S. PATENT DOCUMENTS 7,552,581 B1 * 6/2009 Pfeifer ................ H02G 3/0475
59/900
7,849,667 B2 12/2010 Jaeker et al.
(Continued)

FOREIGN PATENT DOCUMENTS

CN 101176243 A 5/2008
CN 102449867 A 5/2012
(Continued)

OTHER PUBLICATIONS

Translation of WO-2014205464 (Year: 2014).*
Translation of WO-2017046545 (Year: 2017).*
China National Intellectual Property Administration, Examination Report and Search Report for CN202080088593.5, Mar. 22, 2024, pp. 1-9.
(Continued)

*Primary Examiner* — Bobby Yeonjin Kim
(74) *Attorney, Agent, or Firm* — CAHN & SAMUELS, LLP

(57) ABSTRACT

The invention relates to an energy chain for receiving and guiding cables, having pivotal chain links which adjoin one another in the longitudinal direction and each of which has cross members and comprises two side pieces lying opposite each other in a direction (q) transverse to the longitudinal direction (I), wherein the energy chain (5) includes a plurality of sections, each of which is designed in the form of two strand (7, 8) that are connected together by a deflecting region (6) extending about a deflecting arc. The energy chain can be moved about the deflecting arc, and each deflecting region (6) of the plurality of sections is guided on the inner face and the outer face thereof through guide elements (10) extending in an arc-shaped manner about the respective axis of the deflecting arc.

27 Claims, 2 Drawing Sheets

(56) References Cited

U.S. PATENT DOCUMENTS

| | | |
|---|---|---|
| 11,408,483 B2 | 8/2022 | Moritz et al. |
| 2006/0030174 A1 | 2/2006 | Tsubaki et al. |
| 2008/0230340 A1 | 9/2008 | Wehler |
| 2012/0096828 A1 | 4/2012 | Jaeker et al. |
| 2020/0130942 A1 | 4/2020 | Tetsuka |

FOREIGN PATENT DOCUMENTS

| | | | |
|---|---|---|---|
| CN | 109790907 A | 5/2019 | |
| DE | 297 15 820 U1 | 12/1997 | |
| DE | 10 2004 050 148 A1 | 6/2006 | |
| DE | 20 2010 005 842 U1 | 10/2011 | |
| DE | 20 2012 003 945 U1 | 7/2012 | |
| EP | 0 909 725 A2 | 4/1999 | |
| EP | 2 360 062 A1 | 8/2011 | |
| JP | 2003-306089 A | 10/2003 | |
| JP | 2008-536069 A | 9/2008 | |
| KR | 100922345 B1 | 10/2009 | |
| WO | 2011/131662 A2 | 10/2011 | |
| WO | 2013/156605 A1 | 10/2013 | |
| WO | 2013/182889 A1 | 12/2013 | |
| WO | WO-2014205464 A1 * | 12/2014 | ............. B66C 13/12 |
| WO | WO-2017046545 A1 * | 3/2017 | ........... B65H 75/368 |
| WO | 2018/091554 A1 | 5/2018 | |
| WO | 2018/198966 A1 | 11/2018 | |

OTHER PUBLICATIONS

European Patent Office, English abstract for CN101176243A, retrieved Apr. 30, 2024.
European Patent Office, English abstract for JP2003306089A, retrieved Apr. 30, 2024.
China National Intellectual Property Administration, First Office Action for CN 202080088593.5, Nov. 9, 2023, pp. 1-9.
European Patent Office, English abstract for CN102449867A, retrieved on Jan. 20, 2024.
European Patent Office, English abstract for KR100922345B1, retrieved on Jan. 20, 2024.
Deutches Patent- und Markenamt, search report for German App. No. 20 2019 107 116.4, Nov. 24, 2020, pp. 1-5.
European Patent Office, Written Opinion for PCT App. No. PCT/EP2020/087110, Jun. 24, 2021, pp. 1-6.
European Patent Office, International Search Report for PCT App. No. PCT/EP2020/087110, Jun. 24, 2021, pp. 1-3.
European Patent Office, English Abstract for EP0909725A3, printed on Jun. 17, 2022.
The International Bureau of WIPO, International Preliminary Report on Patentability for PCT App. No. PCT/EP2020/087110, May 17, 2022, pp. 1-7.
Japanese Patent Office, Notice of Reasons for Rejection, Nov. 21, 2023, pp. 1-5.

* cited by examiner

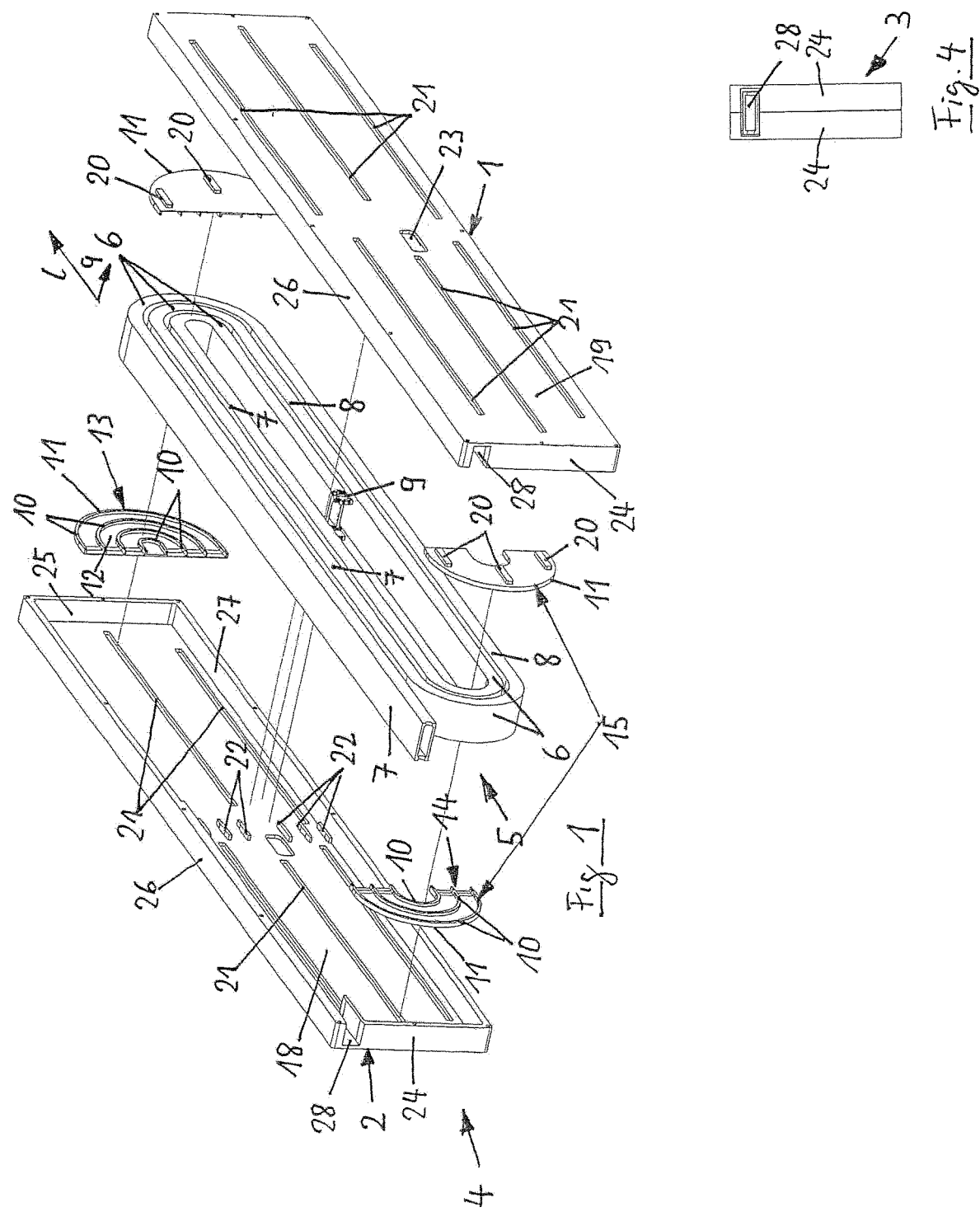

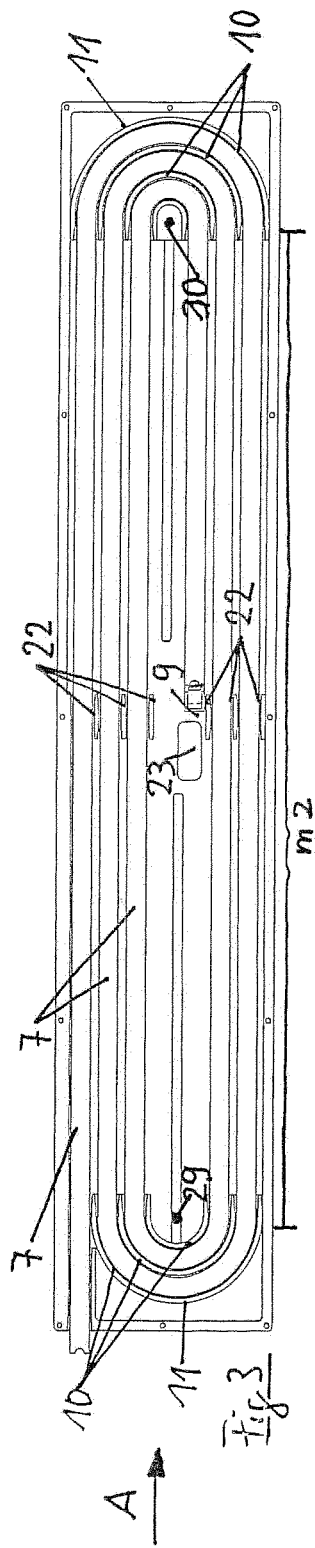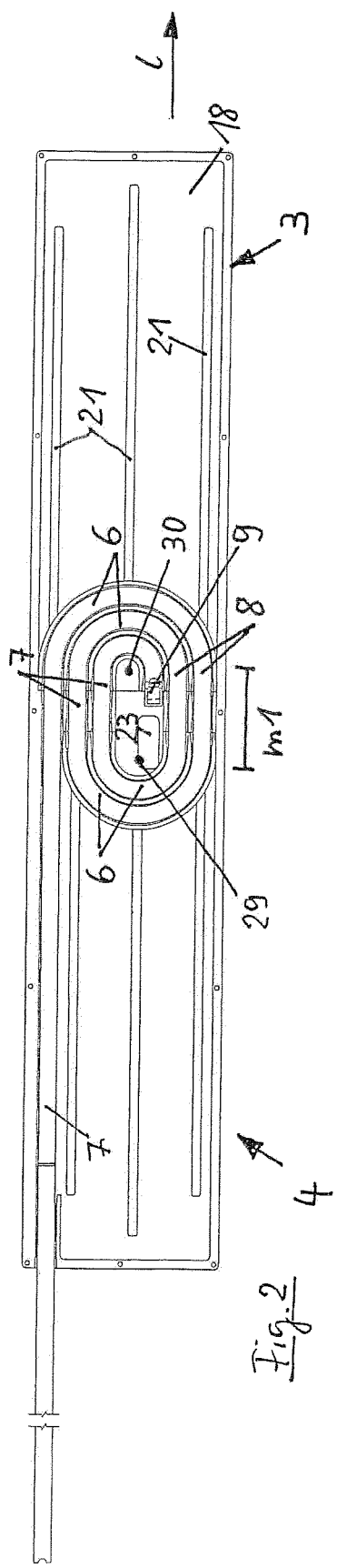

ENERGY CHAIN AND STORAGE UNIT FOR AN ENERGY CHAIN

The invention relates to an energy chain, for receiving and guiding energy and/or communication cables, which has chain links pivotably adjoining one another in the longitudinal direction, wherein the chain links comprise in each case two side parts lying opposite one another in a transverse direction relative to the longitudinal direction and at least some of the chain links have cross members connecting their side parts, wherein the energy chain includes several portions which are each arranged in the form of two strands connected to one another by a deflection region extending about a deflection arc, wherein the energy chain is movable about the deflection arc.

The object of the present invention is to provide an energy chain including several portions of the type specified above, which can be moved with as little friction as possible about the deflection arcs of the deflection regions, wherein the deflection arcs can be subjected to a stabilization.

The object is achieved according to the invention in that each deflection region of the several portions is guided on its inner face and its outer face by guide elements extending in an arc-shaped manner about the respective axis of the deflection arc.

By the inner face of the deflection region is meant the side facing the axis of the associated deflection arc and by the outer face of the deflection region is meant the side of the deflection region facing away from the axis of the associated deflection arc.

The guiding of the energy chain in the deflection region by the guide elements can be affected by sliding guiding.

The guide elements preferably extend in an arc-shaped manner on the inner face and on the outer face over the entire respective deflection region.

The guide elements can also extend beyond the deflection region over an adjoining region of one and/or the other strand adjoining the deflection region.

The guide elements extending on the inner face and/or the outer face of the deflection region can extend over the entire width in the transverse direction q of the deflection region.

The guide elements can extend, formed in the shape of a strip, in the manner of a circular arc on the inner face and/or the outer face of the deflection region.

However, the guide elements can also be formed by connecting links, which in each case guide the deflection region on its inner face and/or outer face in a sliding manner with wall regions.

Adjacent chain links of the energy chain can be capable of being angled in one pivoting direction to a limited degree relative to one another due to limit stops, whereby a minimum radius for the deflection arcs of the deflection regions is defined. Furthermore, they can be capable of being angled in the other pivoting direction to a limited degree up to their orientation stretched out relative to one another. Since adjacent chain links in this case are not pivotable beyond their orientation stretched out relative to one another, in the case of substantially self-supporting strands in particular a straight extension thereof is made possible.

At least some of the several portions of the energy chain can be connected to one another via one strand or both strands.

The cable guide according to the invention can be formed, for example, in the form of a continuous loop with two deflection regions lying opposite one another or have several continuous loops arranged inside one another with in each case two deflection regions lying opposite one another. The axes of the deflection arcs of the deflection regions lying opposite one another in each case can be arranged with a spacing from one another. In the case of several continuous loops arranged inside one another, the deflection arcs of the deflection regions can have two axes, which are arranged with a spacing from one another and about which the deflection regions in question are arranged concentrically.

On the other hand, the energy chain can be arranged wound in the shape of a spiral with two winding axes spaced apart from one another, wherein the deflection arcs of the deflection regions of the energy chain extend about the winding axes. The spacing between the winding axes can be variable when the energy chain is moved.

The deflection arcs of the deflection regions which extend about the same winding axis can be arranged concentrically with one another.

Furthermore, the guide elements for the deflection regions the deflection arcs of which extend about the same winding axis can be arranged concentrically with one another.

The guide elements arranged concentrically with one another can extend in the shape of a strip between the deflection regions.

However, the guide elements arranged concentrically with one another can also be formed by wall regions of a slide block, which guides the deflection regions extending about the respective winding axis in a sliding manner on their respective inner face and/or outer face.

In a preferred embodiment, the guide elements arranged concentrically with one another are arranged laterally on a plate-shaped part, which extends externally parallel to the plane of the deflection arcs of the deflection regions. The inside of the plate-shaped part can serve here as a sliding guide of the deflection regions.

The guide elements can be arranged in a housing, which has two plate-shaped parts laterally, which extend externally parallel to the plane of the deflection arcs of the deflection regions and between which the guide elements are arranged, wherein the housing is open towards the strands extending from the deflection regions. The plate-shaped parts can serve as a lateral sliding guide for the deflection regions.

The housing can consist of two housing shells, the separation face of which lies in a plane which extends parallel to the deflection arcs of the deflection regions.

The invention furthermore relates to a storage unit for an energy chain which comprises a storage housing and an energy chain, which can be arranged therein and is wound in the shape of a spiral, with the features described above, wherein the spirally wound energy chain has two winding axes arranged with a spacing from one another. The energy chain has a fixed connection point arranged stationarily in the storage housing in the interior of the spirally wound energy chain at one of its ends and a movable connection point at its other end, wherein, by movement of the movable connection point and movement caused thereby of the energy chain, the spacing of the winding axes from one another is variable between a minimum spacing and a maximum spacing.

Such a storage unit is suitable in particular for available storage spaces with a relatively long extension for an energy chain, wherein the maximum spacing between the winding axes of the spirally wound cable guide can be chosen to be relatively large and the energy chain can extend over relatively long strands in its maximally retracted state in the storage housing.

In a preferred embodiment of the storage unit, the fixed connection point is arranged in the central region of the storage housing relative to the extension of the storage housing in the longitudinal direction.

According to an alternative embodiment, the fixed connection point can be held stationary by a support of the guide elements extending about one of the two winding axes, in particular of the guide elements the outer faces of which in the storage housing face in the direction of the movable connection point. In this case the fixed connection point is to be transferred to the region of the guide elements held stationary or of the stationary winding axis vis-à-vis the above-described embodiment example. In this case the maximally stored length of the energy chain can be extended compared with the above-described embodiment example by approximately half of the maximum spacing between the winding axes. When the energy chain is completely pulled out of the storage housing, a portion of the energy chain to the movable connection point which is longer by approximately half of the maximum spacing is thus also available. However, this alternative embodiment has the disadvantage that the strands of the energy chain cannot be supported in the central region of the storage housing, as described below.

Because of the guide elements of the spirally wound energy chain guiding the deflection regions along the deflection arcs, it can be pulled out of the storage housing with relatively little tensile force on the strand connected to the movable connection point and can be inserted in the storage housing with relatively little compressive force on the strand connected to the movable connection point in its longitudinal direction. Due to the guiding of the deflection regions according to the invention by the guide elements arranged on their respective inner face and their respective outer face and extending in an arc shape about the respective axis of the deflection arc, only slight friction forces arise in the deflection regions when the energy chain is pulled out of and inserted in the storage housing. The tensile and compressive force can, where appropriate, be exerted manually on the strand connected to the movable connection point and extending out of the storage housing.

The above-described storage unit according to the invention requires no pretensioning of the winding axes and thus of the guide elements guiding the deflection regions into a position in which the winding axes reach their maximum spacing. Producing such a pretensioning would mean an additional design effort for the storage housing.

When the fixed connection point is arranged in the central region of the storage housing, guide devices can be provided to support and guide the strands of the energy chain in the storage housing.

If the guide elements extending about a winding axis according to the above-described embodiment example for the energy chain are arranged in a housing, the housing can be guided in the longitudinal direction of the strands in the case of variation of the spacing of the winding axes on the storage housing, in particular in a sliding manner.

The storage housing can have two parallel side plates, which are arranged parallel to the deflection arcs of the deflection regions of the energy chain and extend in the longitudinal direction of the strands over the deflection regions of the energy chain on both winding axes. The movable connection point can be arranged outside the storage housing.

The plate-shaped parts of the housing containing the guide elements extending about a winding axis can have guide projections moulded on externally, which engage in grooves or openings, extending in the longitudinal direction of the strands, in the side plates of the storage housing.

In the central region of the longitudinal extension of the side plates of the storage housing, guide projections can be provided on their inwardly facing surfaces to support and guide the strands of the energy chain in the storage housing.

Adjoining the region of the fixed connection point, an opening can be provided, at least in one side plate of the storage housing, for feeding the cables emerging from the energy chain in the case of the fixed connection point through.

At the face-side ends of the side plates the storage housing can have face plates and upper and lower closing plates connecting these to one another.

The upper and lower closing plates can be arranged such that they guide the upper or lower strand of the energy chain arranged in the storage housing in a sliding manner.

The storage housing can be formed of two housing shells, the separation face of which lies in a plane which extends parallel to the deflection arcs of the deflection regions of the energy chain.

In the upper or lower region one of the face plates can have a feed-through opening for the strand of the energy chain connected to the movable connection point.

An embodiment example of the present invention is described in more detail below with reference to the drawing.

In the Drawing there are Shown in:

FIG. 1 an exploded perspective representation of a storage unit for an energy chain, FIG. 2 a side view of the energy chain maximally extended out of the storage housing of the storage unit with minimum spacing of the winding axes, FIG. 3 a side view of the energy chain maximally retracted into the storage housing of the storage unit with maximum spacing of the winding axes and FIG. 4 a face-side view in the direction of the arrow A in FIG. 3.

As follows from FIG. 1, an energy chain 5, which is wound in the shape of a spiral about two winding axes spaced apart from one another, is arranged in a storage housing 3, formed by two housing shells 1, 2, of a storage unit 4. The energy chain 5 has several deflection regions 6 which extend about the winding axes and which strands 7, 8 of the energy chain 5 adjoin. The deflection arcs of the deflection regions 6 which extend about the same winding axis are arranged concentrically with one another.

The energy chain 5 has a fixed connection point 9 at its end arranged in the interior of the spiral winding and a movable connection point (not represented in the drawing) at its other end.

To guide the deflection regions 6 when the energy chain 5 is moved, guide elements 10 are provided, which extend on the inner and outer faces in the shape of an arc about the respective winding axis of the deflection regions 6. As shown in FIG. 1, the guide elements 10 are formed in the shape of a strip and extend over a circular arc on the inner and outer faces of the deflection regions 6.

The guide elements 10 for the deflection regions 6 which extend about the same winding axis are arranged concentrically with one another.

The guide elements 10 for the deflection regions 6 which extend about the same winding axis are arranged laterally on a plate-shaped part 11, which is arranged externally parallel to the plane of the deflection regions 6 and is formed in the shape of a substantially semi-circular plate. The guide elements 10 in the shape of a strip extend over approximately half the width of the energy chain 5 in a transverse direction relative to the longitudinal direction I. The inner face 12 of the plate-shaped part 11 serves here as a sliding guide of the deflection regions 6.

As furthermore follows from FIG. 1, two such semi-circular plate-shaped parts 11 with guide elements 10 moulded thereon form housing shells 13, 14 of a housing 15, which receives the deflection regions 6 of the energy chain 5 extending about the respective winding axis in a sliding guiding manner.

As likewise follows from FIG. 1, the storage housing 3 is formed by two housing halves 16, 17. The housing halves 16, 17 each have a side plate 18 or 19, which extends in the longitudinal direction I of the strands 7, 8 of the energy chain 5 over the deflection regions 6 on both winding axes. The two housings 15, which receive the deflection regions 6 extending in each case about a winding axis, are guided laterally in a sliding manner on the side plates 18, 19. For this purpose, the plate-shaped parts 11 of the respective housing 15 have guide projections 20 moulded on externally, which engage in grooves 21, extending in the longitudinal direction I of the strands 7, 8, of the side plates 18, 19.

In the central region of the longitudinal extension of the side plates 18, 19 of the storage housing 3, guide projections 22 are moulded onto their inwardly facing surfaces to support and guide the strands 7, 8 of the energy chain 5.

Adjoining the region of the fixed connection point 9, an opening 23 is provided in both side plates 18, 19 of the storage housing 3 for feeding the cables (not shown in the drawing) emerging from the energy chain 1 in the case of the fixed connection point 9 through.

At the face-side ends of the side plates 18, 19 the storage housing 3 has face plates 24, 25 and upper and lower closing plates 26, 27 connecting these to one another. The closing plates 26, 27 are arranged such that they guide the radially outwardly facing upper and lower edge of the housing 15 remote from the movable connection point in a sliding manner. The housing 15 lying closer to the movable connection point is guided in a sliding manner at its upper and lower edge between the lower closing plate 27 and the strand 7 connected to the movable connection point.

The face plates 24 of the two housing shells 13, 14 facing towards the movable connection point have a feed-through opening 28 in their upper region for the strand 7, connected to the movable connection point, of the energy chain 1.

FIG. 2 shows the arrangement of the spirally wound energy chain 1 in its maximally extended position out of the storage housing 3. In this position with a minimum spacing m1 of the two winding axes 29, 30, the straight end faces of the semi-circular plate-shaped parts 11 of the housing 15 and the free ends of the arc-shaped guide elements 10 arranged therein rest, on the face side, against the guide projections 22 of the housing halves 16, 17 of the storage housing 3 and thus define the minimum spacing m1 between the winding axes 29, 30.

If the energy chain 5 is retracted into the storage housing 3 by applying pressure to the movable connection point and the strand 7 connected thereto, the two housings 15 receiving the deflection regions 6 migrate in opposite directions to one another by virtue of the forces exerted by the pressure of the deflection regions 6 on the housings 15, wherein the spiral winding widens in the longitudinal direction of the storage housing 3 and the spacing between the winding axes 29, 30 increases until the housings 15 stop in the region of the face plates 24, 25 of the storage housing 3 and, as shown in FIG. 3, the maximum spacing m2 between the winding axes 29, 30 is reached.

LIST OF REFERENCE NUMBERS

1 Housing shell
2 Housing shell
3 Storage housing
4 Storage unit
5 Energy chain
6 Deflection region
7 Strand
8 Strand
9 Fixed connection point
10 Guide element
11 Plate-shaped part
12 Inner face
13 Housing shell
14 Housing shell
15 Housing
16 Housing half
17 Housing half
18 Side plate
19 Side plate
20 Guide projection
21 Groove
22 Guide projection
23 Opening
24 Face plate
25 Face plate
26 Closing plate
27 Closing plate
28 Feed-through opening
29 Winding axis
30 Winding axis
31 Winding axis
I Longitudinal direction
q Transverse direction
m1 Minimum spacing
m2 Maximum spacing

The invention claimed is:

1. An energy chain system for receiving and guiding energy and/or communication cables, the energy chain system comprising:
    an energy chain having chain links pivotably adjoining one another in the longitudinal direction, wherein the chain links comprise in each case two side parts lying opposite one another in a transverse direction (q) relative to the longitudinal direction (I) and at least some of the chain links have cross members connecting their side parts, wherein the energy chain (5) includes several portions which are each arranged in the form of two strands (7, 8) connected to one another by a deflection region (6) extending about a deflection arc, wherein the energy chain (5) is movable about the deflection arc, and
    guide elements (10) extending in an arc-shaped manner about the respective axis of the deflection arc such that each deflection region (6) of the several portions is guided on its inner face and its outer face by guide elements (10), wherein the guide elements (10) extend in the shape of an arc on the inner face and on the outer face over the entire respective deflection region (6).

2. The energy chain system according to claim 1, wherein the guiding thereof in the deflection region (6) by the guide elements (10) is affected by sliding guiding.

3. The energy chain system according to claim 1, wherein the guide elements (10) extend beyond the deflection region (6) over an adjoining region of one and/or the other strand (7, 8) adjoining the deflection region (6).

4. The energy chain system according to claim 1, wherein the guide elements (10) extend over the entire width of the deflection region (6) in a transverse direction (q).

5. The energy chain system according to claim 1, wherein the guide elements (10) extend in each case in the shape of a strip in the manner of a circular arc on the inner face and/or the outer face of the deflection region (6).

6. The energy chain system according to claim 1, wherein the guide elements (10) are formed by slide blocks, which in each case guide the deflection region (6) on its inner face and/or outer face in a sliding manner with wall regions.

7. The energy chain system according to claim 1, wherein adjacent chain links of the energy chain (5) are capable of being angled in one pivoting direction relative to one another to a limited degree due to limit stops, whereby a minimum radius for the deflection arcs of the deflection regions (6) is defined, and are capable of being angled in the other pivoting direction to a limited degree up to their orientation stretched out relative to one another.

8. The energy chain system according to claim 1, wherein at least some of the several portions of the energy chain (5) are connected to one another via one strand or both strands (7, 8).

9. The energy chain system according to claim 8, wherein the energy chain (5) is arranged wound in the shape of a spiral with two winding axes (29, 30) spaced apart from one another, about which the deflection arcs of the deflection regions (6) of the energy chain (5) extend.

10. The energy chain system according to claim 9, wherein the deflection arcs of the deflection regions (6) which extend about the same winding axis (29, 30) are arranged concentrically with one another.

11. The energy chain system according to claim 10, wherein the guide elements (10) for the deflection regions (6) which extend about the same winding axis (29, 30) are arranged concentrically with one another.

12. The energy chain system according to claim 11, wherein the guide elements (10) arranged concentrically with one another extend in the form of a strip between the deflection regions (6).

13. The energy chain system according to claim 11, wherein the guide elements (10) arranged concentrically with one another are formed by wall regions of a slide block that guide the deflection regions (6) extending about the respective winding axis (29, 30) in a sliding manner on their respective inner face and/or outer face.

14. The energy chain system according to claim 11, wherein the guide elements (10) arranged concentrically with one another are arranged laterally on a plate-shaped part (11), which extends externally parallel to the plane of the deflection arcs of the deflection regions (6).

15. The energy chain system according to claim 14, wherein the guide elements (10) are arranged in a housing (15), which has two of the plate-shaped parts (11) laterally, which extend externally parallel to the plane of the deflection arcs of the deflection regions (6) and between which the guide elements (10) are arranged, wherein the housing (15) is open towards the strands (7, 8) extending from the deflection regions (6).

16. The energy chain system according to claim 15, wherein the housing (15) consists of two housing halves (16, 17), the separation face of which lies in a plane which extends parallel to the deflection arcs of the deflection regions (6).

17. A storage unit (4) for an energy chain, the storage unit (4) comprises
a storage housing (3) and
the energy chain system according to claim 10, wherein the energy chain (5); is arranged in the storage housing and wound in the shape of a spiral, wherein the spirally wound energy chain (5) includes the two winding axes (29, 30) arranged spaced from one another, and has a fixed connection point (9) arranged stationarily in the storage housing in the interior of the spirally wound energy chain (5) at one of its ends and a movable connection point at its other end, wherein, by movement of the movable connection point and movement caused thereby of the energy chain (5), the spacing of the winding axes (29, 30) from one another is variable between a minimum spacing (m1) and a maximum spacing (m2).

18. The storage unit (4) according to claim 17, wherein no pretensioning causing a variation of the spacing of the two winding axes (29, 30) towards their maximum spacing (m2) is provided between the deflection regions (6) extending about one of the two winding axes (29, 30) on the one hand and the deflection regions (6) extending about the other of the two winding axes (29, 30) on the other hand.

19. The storage unit (4) according to claim 17, wherein the fixed connection point (9) is arranged in the central region relative to the extension of the storage housing (3) in the longitudinal direction (I) of the strands (7, 8) of the energy chain (5).

20. The storage unit (4) according to claim 17, wherein, in the central region of the storage housing (3) relative to an extension in the longitudinal direction (I) of the strands (7, 8) of the energy chain (5), guide elements are provided to support and guide the strands (7, 8) of the energy chain (5) in the storage housing (3).

21. The storage unit (4) according to claim 17, wherein the storage housing has two parallel side plates (18, 19), which are arranged parallel to the deflection arcs of the deflection regions (6) of the energy chain (5) and extend in the longitudinal direction (I) of the strands (7, 8) over the deflection regions (6) of the energy chain (5) on both winding axes (29, 20).

22. The storage unit (4) according to claim 21, wherein the guide elements (10) are arranged in a housing (15) having two plate-shaped parts (11), wherein the plate-shaped parts (11) of the housing have guide projections (20) moulded on externally, which engage in grooves (21) or openings, extending in the longitudinal direction (I) of the strands (7, 8), in the side plates (18, 19) of the storage housing (3).

23. The storage unit (4) according to claim 21, wherein, in the central region of the longitudinal extension of the side plates (18, 19) of the storage housing, guide projections (22) are provided on inwardly facing surfaces of the side plates (18, 19) to support and guide the strands (7, 8) of the energy chain (5) in the storage housing (3).

24. The storage unit (4) according to claim 21, wherein, adjoining the region of the fixed connection point (9), an opening (23) passes through at least in one of the side plates (18, 19) of the storage housing (3), the opening (23) is configured to feed cables emerging from the energy chain (5).

25. The storage unit (4) according to claim 21, wherein at the face-side ends of the side plates (18, 19) the storage housing (3) includes face plates (24, 25) and upper and lower closing plates (26, 27) connecting these to one another.

26. The storage unit (4) according to claim 25, wherein the upper and lower closing plates are arranged such that they guide the two housings (15) in a sliding manner thereon.

27. The storage unit (4) according to claim 25, wherein in the upper or lower region of one of the face plates (24, 25) there is a feed-through opening (28) for the strand (7) of the energy chain (5) connected to the movable connection point.

* * * * *